Figure 1:
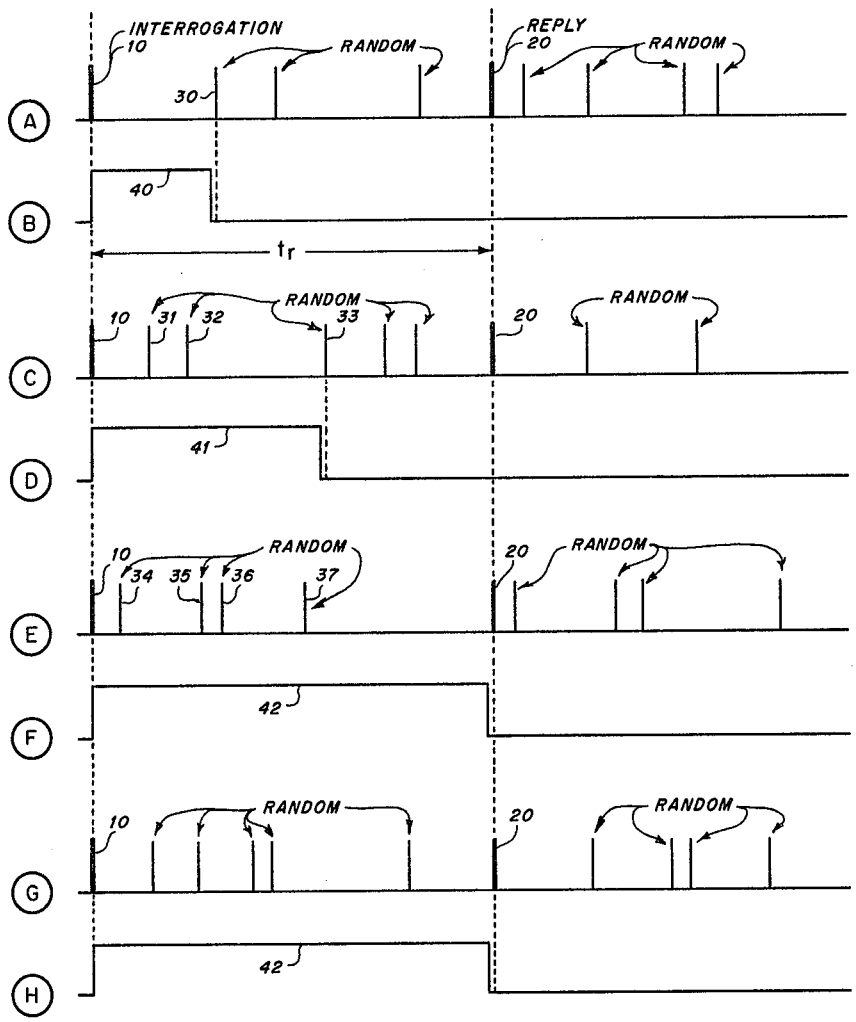

Aug. 16, 1966 O. SHAMES 3,267,464
RAPID SYNCHRONOUS TIME INTERVAL DETECTOR
Filed Oct. 30, 1963 2 Sheets-Sheet 2

INVENTOR.
OSCAR SHAMES
BY Henry Hauser
J. A. Cooke
ATTORNEYS

United States Patent Office 3,267,464
Patented August 16, 1966

3,267,464
RAPID SYNCHRONOUS TIME INTERVAL
DETECTOR
Oscar Shames, Philadelphia, Pa., assignor to International
Telephone and Telegraph Corporation, New York,
N.Y., a corporation of Maryland
Filed Oct. 30, 1963, Ser. No. 320,234
6 Claims. (Cl. 343—7.3)

The invention described herein may be manufactured and used by or for the Government of the United States of America for governmental purposes without the payment of any royalties thereon or therefor.

The present invention relates to an electronic system for locating a synchronous pulse or signal from among a large number of random pulses or signals.

The existing ranging circuits in TACAN include a transmitter for transmitting interrogating or challenge pulses to a beacon which is adapted to transmit reply signals or pulses which, for example, may be used for determining the distance of the interrogator with respect to the beacon. In such systems there is generally only one reply signal received for each challenge or interrogation pulse because the reply pulse is transmitted by different radio frequency channels from that used for interrogation signals. The usual reflection echoes from various objects are thus rejected. However, interference caused by the challenge of other interrogators may cause numerous replies from the beacon but the timing of these reply signals with respect to the interrogation signals of any one interrogator will be erratic and out of synchronism with such interrogation signals.

The method by which a TACAN interrogator unit transmits interrogation pulses and selects from a train of random beacon reply pulses the particular beacon pulses replying to said interrogation pulses will now be described. An electromechanical range indicator in the airborne unit is tied to a variable delay circuit which is made to search continuously outward in the form of a gate. This gate is started in synchronism with the interrogation pulse and searches outwardly as the range indicator moves. When the gate moves to the location of the reply pulse, the reply will fall within the gate a series of times on successive interrogations (since the gate moves slowly). The equipment includes such circuitry that at least six pulses received within the duration of the gate are necessary to develop a potential exceeding a critical level at which the search is ended and the tracking initiated. As can be readily seen, the above-described analog system requires a continuous search to locate the synchronous pulse and is obviously a time consuming procedure.

The general purpose of this invention is to provide a synchronous time interval detector which embraces all the advantages of similarly employed prior art devices and possesses none of the above-indicated disadvantages. To attain this, the present invention contemplates the use of discrete large steps in the search process rather than the time consuming, wasteful continuous search methods used in the prior art. This is accomplished by starting an electronic counter with a start, sync or interrogation pulse and stopping it with a pulse from a limiter. The elapsed time interval is stored and a blanking pulse of this duration is generated on the next interrogation. On the succeeding interrogation the first limiter pulse after the blanking pulse will stop the counter. By making the blanking pulse slightly shorter than the previous count on the counter, the counter will stop at the same count when the synchronous pulse is received.

An object of the present invention is to provide a unit for transmitting a series of start or sync pulses and to select from a train of random reply pulses a particular pulse replying to said start or sync pulses.

A further object of the present invention is to provide a means of locating a synchronous pulse or signal from among a large number of nonsynchronous pulses or signals in a simple, rapid manner.

Still another object of the invention is to provide a means for locating a synchronous pulse or signal from among a large number of nonsynchronous or random pulses or signals utilizing digital techniques which lends itself to microminiaturization.

A still further object of the invention is to provide an interrogator unit for use in radar beacon systems to transmit interrogation pulses and to select from a train of random beacon reply pulses the particular beacon pulses replying to said interrogation pulses and one which will permit a reduction in the number of interrogations that are presently used thereby reducing power requirements.

Another object of the invention is to provide an interrogator unit for use in radar beacon systems to transmit interrogation pulses and to select from a train of random beacon reply pulses the particular beacon pulses replying to said interrogation pulses in a fraction of the time heretofore required.

Still another object of the invention is to provide an interrogator unit for use in radar beacon systems to transmit interrogation pulses and to select from a train of random beacon reply pulses the particular beacon pulses replying to said interrogation pulses which will permit successful search for the synchronous reply pulse under conditions of less than 100 percent reply efficiency and which will be able to search successfully under poor signal to noise ratios.

Other objects and advantages will be apparent from the following description of an embodiment of the invention and the novel features thereof will be particularly pointed out hereinafter in connection with the appended claims.

Figure 2:
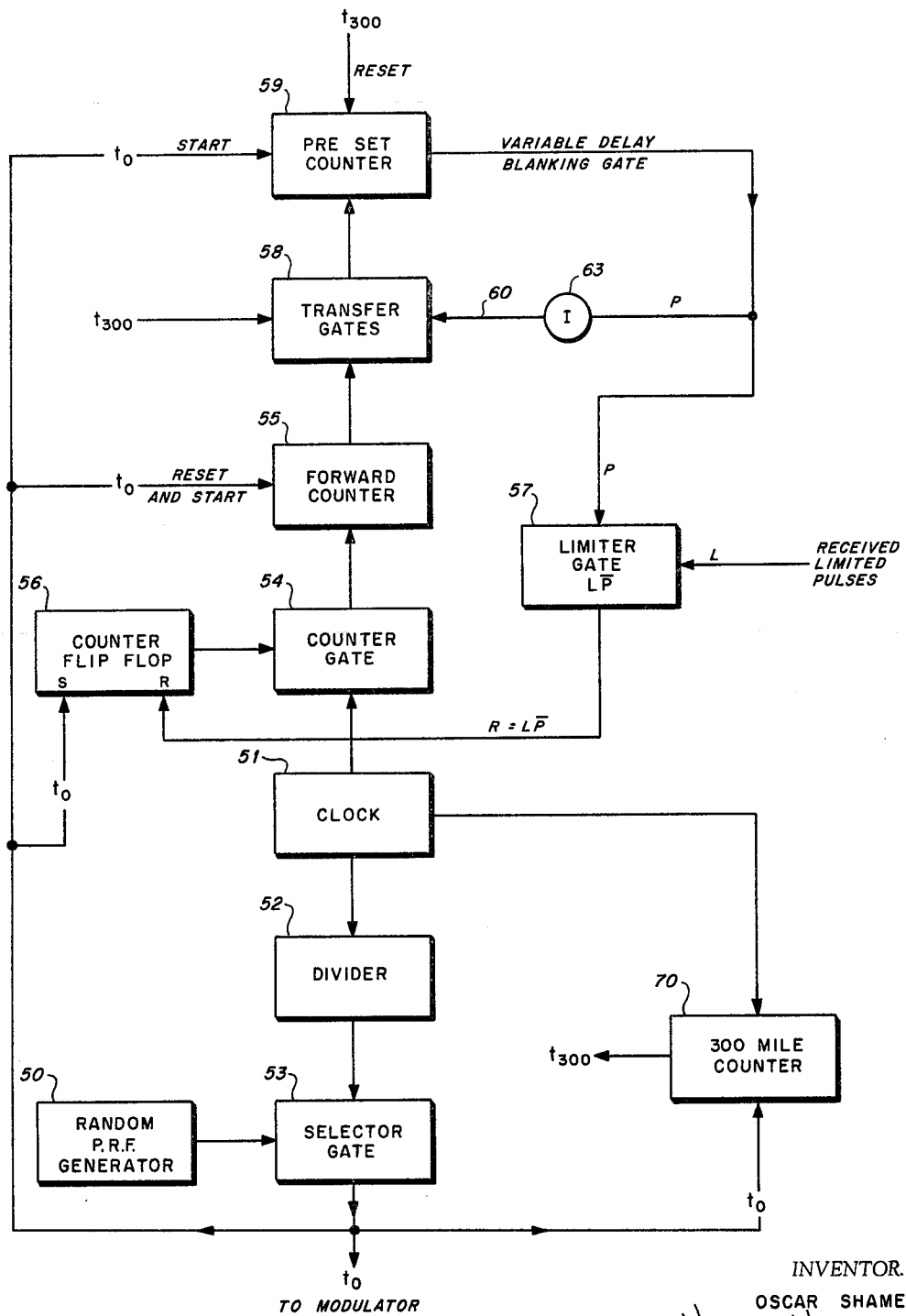

In the accompanying drawing:
FIG. 1 is a graphic representation of the various wave forms used to explain the operation of the equipment of the present invention.
FIG. 2 is a schematic block diagram of the synchronous time interval detector of the present invention.

Although the following disclosure is related to a preferred embodiment of the invention it is understood that the references made to TACAN are not limiting but merely descriptive of a preferred embodiment and that the invention may be used wherever it is desired to locate a synchronous pulse or signal from among a large number of nonsynchronous pulses or signals.

The basic aspects of the present invention may best be described with reference to FIG. 1 wherein the pulse output of a TACAN receiver on four successive interrogations is depicted. The interrogation pulse 10 and the reply pulse 20 are shown in the lines A, C, E and G and it is seen that the reply pulse 20 which is synchronous with the interrogation pulse 10 maintains through the series of interrogations a constant time difference with respect to the interrogation pulse. This time difference is indicated as $t_r$ and is proportional to the range of the TACAN set from the associated transponding beacon.

In principle the first interrogation pulse starts a flip-flop which is stopped by the first pulse received after the interrogation. In line A this first pulse after the interrogation 10 would be a random pulse 30. The flip-flop will then generate a signal of a length in time determined by the time interval between the interrogation pulse and the first random pulse received, here 10 and 30, respectively. This flip-flop signal is used to control a counter which counts out the time interval and memorizes the signal width. The output of the counter is used to generate another signal which is similar to the flip-flop signal and is denoted as a blanking pulse. This blanking pulse is illustrated by 40 on line B and is used to blank the output of the TACAN receiver for the interval of time of the pulse so that the flip-flop will not receive any pulses to stop it until after this time interval. Line C indicates the TACAN receiver output after the second interrogation during which the blanking pulse 40 blanks out the two random pulses 31 and 32. The first pulse that can stop the flip-flop is pulse 33 of line C, and the flip-flop generates a new signal which is recorded as a new count on the counter, the output of which generates a new blanking pulse 41 which is indicated in line D. The TACAN receiver output after the third interrogation is indicated at line E and it is seen that the reply pulse 20 is still stationary but that the random pulse targets have moved to other locations with respect to the interrogation pulse. The blanking pulse 41 of line D blanks out the TACAN receiver output so that the flip-flop will not receive the random pulses 34, 35, 36 and 37 and, therefore, stops at the next pulse received which is the reply pulse 20. Since the counter is storing the time indicative of the width of the flip-flop signal then at this instant the counter is indicating the range $t_r$ between the TACAN set and the beacon. In order to maintain the counter reading at the range $t_r$ the count recorded in the counter by reason of the flip-flop stopping at the reply pulse is made to be slightly less. Therefore, when the blanking pulse 42 is generated it also is slightly less than the original flip-flop signal so that reply pulse 20 will again stop the counter which then continually reads the distance $t_r$. Line F illustrates the blanking pulse 42 generated by the counter after the flip-flop has been stopped by the reply pulse 20. Line G illustrates the TACAN receiver output after the fourth interrogation wherein the various random pulses shown are blanked out by the blanking pulse 42 illustrated in line F but since this pulse is shortened the flip-flop will again be triggered by the reply pulse 20. The continuation of this interrogating action as in line H will result in the counter being maintained at the same reading $t_r$ which is indicative of the actual range of the interrogating object from the beacon. It is apparent that if there is shown a counter operates lights containing distance numerals and the interrogation rate is, for example, thirty times a second, then when the synchronous reply is reached the same display lights will light thirty times a second thereby obtaining a satisfactory nonflickering display. During the process of searching for the synchronous reply pulse the random pulses will cause the display lights to be on for only one-thirtieth of a second thereby producing a flickering non-readable display. Therefore, this system produces the situation of being able to readout only when the correct pulse is located.

Referring now to FIG. 2, there is shown a block diagram of the automatic rapid synchronous time interval detector. An interrogation pulse is generated by a random pulse repetition frequency (P.R.F.) generator generally note dat 50 which generates a series of pulses at some rate such as 150 pulses per second. These pulses are made sufficiently wide to be able to bracket one of the clock pulses from clock 51 after division to a suitable number by divider 52. The selection of the interrogation pulse is accomplished by the use of a clock 51 which may be, for example, a one megacycle clock thereby providing a period of time between pulses of one microsecond and the output of which is supplied to a divider circuit 52 which divides the clock pulses to a particular rate. The particular rate will depend on the degree of randomness desired for the interrogations. A typical rate might be 4000 pulses per second. The pulse output of divider circuit 52 is supplied to selector gate 53 which, in turn, provides an interrogation or output pulse $t_0$ when there is coincidence between one of the divided clock pulses and one of the random pulses generated by the P.R.F. generator 50 which is also tied to selector gate 53. The pulse output $t_0$ is applied to a modulator, not shown, which provides the interrogation pulses for interrogating a beacon, also not shown. The interrogation rate (one pulse every $\frac{1}{150}$ of a second) would thus be that of the P.R.F. generator 50, yet it would be synchronized with the clock 51.

The clock pulses emanating from clock 51 are also applied through counter gate 54 to the forward counter 55. Counter 55 is permitted to count the clock pulses only when a flip-flop signal is present. This latter mentioned signal is generated by a counter flip-flop 56 which has the output thereof applied to the counter gate 54. Counter flip-flop 56 is set by pulse $t_0$ which is derived from the selector gate 53. The pulse which resets or stops the counter flip-flop 56 and therefore the forward counter 55 is derived from the output of limiter gate 57 which, in turn, is supplied with an input L which is the pulse output of the TACAN receiver, not shown. The limiter gate 57 is interposed as a logic circuit so that not any pulse received from the limiter would reset or stop the counter flip-flop 56 but only the first pulse received after some blanking pulse has been applied. In other words, the limiter gate 57 provides an output pulse R for resetting or stopping the counter flip-flop 56 when there is a received pulse L and not a blanking pulse P, described below, applied to the limiter gate 57.

Counter gate 54 acts in such a manner that when the counter flip-flop 56 is on and clock pulses from clock 51 are received, the output of counter gate 54 will be supplied to the forward counter 55. However, when the counter flip-flop signal ends, then the clock pulses can no longer go through to the forward counter 55. Forward counter 55 is reset to zero and begins counting when pulse $t_0$ is applied and stops when the counter flip-flop 56 stops. It is, therefore, seen that the count in forward counter 55 represents the width of the flip-flop signal generated by counter flip-flop 56. The count held by the forward counter 55 also represents the time between the interrogation pulse and the first pulse received from the TACAN receiver after some blanking interval.

Clock pulses from clock 51 are also applied to a three hundred mile counter 70, the three hundred miles indicating the intended search range of the system. The counter 70 is turned on by the $t_0$ pulse and after counting the number of pulses corresponding to the time required for pulse energy to travel the three hundred miles and return, which is approximately $\frac{1}{270}$ of a second after receiving the $t_0$ pulse, the counter 70 will provide an output pulse $t_{300}$. In this particular instance, the $t_0$ pulse occurs at a rate of 150 pulses per second while the $t_{300}$ pulse occurs at the faster rate of approximately 270 pulses per second thereby allowing sufficient time for the $t_{300}$ pulse to be generated before the succeeding $t_0$ pulse is generated. It is to be understood that the figures cited above are not limiting but rather exemplary. Transfer gates 58 receive the $t_{300}$ pulse from counter 70 and permit the information held in the forward counter 55 to be transferred to a preset counter 59 if the pulse $t_{300}$ is present and the input signal 60 to be described below is also present.

The preset counter 59 has the function of generating a blanking pulse P equal in time duration to a number which has been stored or preset within it. Thus, assuming a three hundred mile ranging system, a pulse covering the time equivalent of zero to three hundred miles can be generated. In the absence of any preset information in the counter, a pulse of a width corresponding to zero miles will be generated. The preset counter 59 commences to generate this blanking pulse P when the $t_0$ pulse is applied thereto and it is this pulse which is utilized to blank the receiver. At a time corresponding to the maximum range of three hundred miles, the preset counter 59 will be reset by pulse $t_{300}$ and will immediately thereafter be given a new preset number via the transfer gates 58 which will transfer the count in the forward counter 55 to the preset counter.

In order to preclude the forward counter from counting beyond the range of interest, for example three hundred miles, and in order to transfer the information or count held in the forward counter 55 immediately after the preset counter 59 has been reset to zero by the $t_{300}$ pulse, transfer gates 58 are utilized. As indicated above these transfer gates 58 will transfer the count to the preset counter 59 when the $t_{300}$ pulse and pulse 60 are present and both positive. Pulse 60 is obtained in a manner now to be discussed. When the preset counter contains a count, a blanking pulse P is generated as a positive-going pulse and as such is supplied to inverter 63. This inverter inverts the signal and supplies the signal 60, which is a negative-going pulse, to the transfer gates 58. The resultant effect is to block the same and prevent transfer of the contents of the forward counter when the $t_{300}$ pulse is received by the gate 58. In the situation where the blanking pulse has expired, say, for example after the time corresponding to twenty miles, the negative-going pulse is inverted by inverter 63 to a positive-going pulse which when applied to transfer gates 58 will transfer the forward counter information to the preset counter 59 at the time the $t_{300}$ pulse is applied. As is readily seen the prior mentioned situation arises when the detector attempts to search beyond the range of interest, here three hundred miles.

The following is a description of the operation of the present invention and it should be noted herein that although the use of the $t_{300}$ pulses appears to be simultaneous, in operation suitable delay lines would be interposed by conventional state of the art techniques so that the pulse $t_{300}$ applied to the transfer gates 58 occurs slightly after, for example, one microsecond, the pulse $t_{300}$ is applied to the preset counter 59 to reset the same. Similarly a small delay would be inserted following inverter 63 to insure blocking of the transfer gates 58 after searching out to three hundred miles.

In operation, when the equipment is turned on the preset counter is set at a zero reading. The first interrogation pulse $t_o$ causes the preset counter to generate a pulse corresponding in time to zero miles which actually fails to blank the receiver at all and, therefore, the first pulse received after the interrogation will stop the forward counter 55 which also had been started with the $t_o$ pulse. The manner in which the forward counter 55 is stopped by the pulses from the TACAN receiver has been discussed above and it is not considered necessary to repeat the description of this part of the operation of the invention.

For purposes of discussion it is assumed that the first pulse from the TACAN receiver that stops the forward counter occurs after a time interval corresponding to two miles. Therefore, after the first interrogation the forward counter 55 holds a two mile count. At a time corresponding to three hundred miles after the first interrogation was made the preset counter 59 is reset to zero by the $t_{300}$ pulse which at this time is of no particular significance since there is no preset count in the counter 59 as yet. Due to a delay line, not shown, a short interval after the $t_{300}$ pulse has reset the preset counter 59 the $t_{300}$ pulse is applied to the transfer gate 58 which will transfer the count of two miles held in the forward counter 55 if the pulse 60 is positive. In this instance pulse 60 is positive since a negative-going pulse is generated by preset counter 59 at this time, which is inverted by inverter 63. Therefore, there is nothing to inhibit the transfer of the two mile count to the preset counter. Now the preset counter 59 is holding a two mile count and on the second interrogation another $t_o$ pulse will start the preset counter 59 which will generate a blanking pulse which will blank the receiver for a time equivalent to the two miles. Therefore, nothing can stop the forward counter until the time interval corresponding to the two mile interval has elapsed. The first pulse received from the TACAN receiver thereafter will stop the forward counter 55. Assuming that this pulse occurs at a time interval corresponding to ten miles, the forward counter 55 now holds a ten mile count since the $t_o$ pulse had previously reset the forward counter to zero. The preset counter at this time still holds the two mile count but at the time corresponding to three hundred miles the $t_{300}$ pulse will reset the preset counter 59 to zero. At a short interval thereafter the $t_{300}$ pulse applied to the transfer gates 58 will permit the ten mile count held in the forward counter 55 to be transferred to the preset counter 59 since here again pulse 60 is positive. Therefore, the forward counter 55 and the preset counter 59 both hold a ten mile count. On the next interrogation the forward counter 55 is reset to zero and started again by the $t_o$ pulse. The $t_o$ pulse also starts the preset counter 59 in its generation of a blanking pulse which blanks the receiver for a time interval equivalent to ten miles. If it be assumed that a pulse received at ten miles is the reply pulse and noting that the blanking pulse being generated is slightly less than the count held in the preset counter, then the first pulse received after the receiver is blanked by the blanking pulse will again be the ten mile pulse which will stop the forward counter by reason of the arrangement of counter gate 54, counter flip-flop 56, and limiter gate 57 as described above. The forward counter 55 which had been reset by the $t_o$ pulse now holds the ten mile count. At the time corresponding to three hundred miles the $t_{300}$ pulse resets the preset counter 59 and at a slightly later interval thereafter it receives the ten mile count again by reason of the unblocking of transfer gates 58 as described above.

As can be readily seen the next interrogation will cause the preset counter 59 to again generate a blanking pulse having a time interval corresponding to slightly less than ten miles with the result that the forward counter will repeatedly have a ten mile count registered therein which by reason of the speed of operation will provide a non-flickering display easily susceptible to readout.

Adjustment of the preset counter 59 is one way in which the blanking pulse can be made slightly shorter than the count actually held by the preset counter.

Assuming the synchronous reply pulse is not located, it is seen from the above discussion that the blanking pulse P, inverter 63 and the transfer gates 58 preclude the system from searching for the reply beyond the range of interest, here three hundred miles. Assuming that preset counter 59 has a preset count slightly greater than the time corresponding to three hundred miles then on the next interrogation a blanking pulse having a time interval corresponding to greater than three hundred miles will be generated. At the time of transfer, transfer gates 58 will be blocked since pulse 60 is negative which occurs since the positive-going blanking pulse P was inverted by inverter 63. Upon blocking, the preset counter 59 resets, receives a zero count and the search cycle begins again.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. In a ranging system, a detector for use with a receiver for locating a synchronous return pulse propagated from a corresponding beacon and received by the receiver from among a number of non-synchronous pulses received by the receiver comprising:

a source of timing pulses;

means coupled to said source for generating interrogation pulses;

means for blocking reception of the return pulse for a preset time interval after the generation of each of said interrogation pulses;

means for measuring the time interval between the generation of each of said interrogation pulses and the reception of the first return pulse after the expiration of said blocking time interval;

means coupled to said source of timing pulses and said measuring means for providing an output train of pulses indicative of said measured time interval; and means connecting said measuring means to said blocking means for supplying said output train of pulses to said blocking means for resetting said preset time interval.

2. The device as defined in claim 1 wherein said means for blocking reception includes:

preset counter means for storing a count of said output train of pulses representative of the time interval between the generation of each of said interrogation pulses and the reception of the first return pulse after the expiration of said blocking time interval and for generating a blanking pulse representative of said count.

3. The device as defined in claim 2 further including:

a first gate;

said measuring means coupled to receive said return pulses through said first gate;

and said preset counter means coupled to said first gate to close the same while said preset counter is generating a blanking pulse to thereby preclude feeding of the return pulses to said measuring means and to open the same at the termination of said blanking pulse.

4. The device as set forth in claim 3 wherein said means for measuring the time interval includes:

a second gate;

flip-flop means coupled to said first gate and said second gate for opening said second gate to permit feeding of said timing pulses from said timing source to said means for providing an output train of pulses, said flip-flop means responsive to the output from said first gate for closing said second gate to preclude feeding of said timing pulses from said timing source.

5. In a ranging system, a detector for use with a receiver for locating a synchronous return pulse propagated from a corresponding beacon and received by the receiver from among a number of nonsynchronous pulses received by the receiver comprising:

a source of timing pulses;

means coupled to said source of timing pulses for generating interrogation pulses at periodic intervals;

a first gate connected to said source of timing pulses;

a first counter connected to said source of timing pulses through said first gate for counting said timing pulses;

means connected to said first gate for opening said first gate in response to each of said interrogation pulses to allow pulses from said source of timing pulses to pass to said first counter and for closing said first gate in response to a pulse received from the receiver;

a second gate;

a second counter coupled to said first counter through said second gate;

means for opening said second gate to transfer the count within said first counter to said second counter prior to a subsequent interrogation pulse;

means connecting said second counter to said means for generating interrogation pulses;

said second counter generating a blanking pulse in response to a subsequent interrogation pulse for blanking the pulses received from the receiver for a time interval corresponding to the count transferred from said first counter;

whereby the first pulse received from the receiver after the blanking interval will close said first gate.

6. In a ranging system, a detector for use with a receiver for locating a synchronous return pulse propagated from a corresponding beacon and received by the receiver from among a number of non-synchronous pulses received by the receiver comprising:

a source of timing pulses;

means coupled to said source of timing pulses for generating interrogation pulses at periodic intervals;

a counter gate connected to said source of timing pulses;

a forward counter connected to said source of timing pulses through said counter gate for counting said timing pulses;

means connecting said forward counter to said means for generating interrogation pulses;

a flip-flop circuit coupled to said counter gate and having two steady states respectively corresponding to gate opening and gate closing states;

means connecting said flip-flop circuit to said means for generating interrogation pulses;

gate means for passing pulses received from the receiver to said flip-flop circuit;

said flip-flop circuit being set to said gate opening state by each interrogation pulse and set to said gate closing state by a pulse from said gate means;

a transfer gate;

a preset counter coupled to said forward counter through said transfer gate;

means for opening said transfer gate to transfer the count within said forward counter to said preset counter prior to a subsequent interrogation pulse;

means connecting said preset counter to said means for generating interrogation pulses;

said preset counter generating a blanking pulse having a time interval corresponding to the count transferred from said forward counter in response to a subsequent interrogation pulse;

said blanking pulse being supplied to said gate means for precluding the pulses received from the receiver from passing to said flip-flop circuit during the duration of said blanking pulse;

whereby the first pulse received by said gate means from the receiver after the blanking interval will stop said forward counter.

References Cited by the Examiner

UNITED STATES PATENTS

| | | | |
|---|---|---|---|
| 2,786,995 | 3/1957 | Pollard | 343—7.3 |
| 2,796,602 | 6/1957 | Hess et al. | 343—6.5 |
| 3,012,721 | 12/1961 | Fiske | 343—5 |
| 3,035,263 | 5/1962 | Lader et al. | 343—5 |
| 3,075,189 | 1/1963 | Lisicky | 343—7.3 |
| 3,092,831 | 6/1963 | Mercer | 343—7.3 |
| 3,103,661 | 9/1963 | Hahn | 343—7.3 |
| 3,167,772 | 1/1965 | Bagnall et al. | 343—6.5 X |
| 3,171,119 | 2/1965 | Nuese et al. | 343—6.5 X |

CHESTER L. JUSTUS, *Primary Examiner.*

E. T. CHUNG, P. M. HINDERSTEIN,
*Assistant Examiners.*